(12) United States Patent
Liao et al.

(10) Patent No.: US 12,059,875 B2
(45) Date of Patent: *Aug. 13, 2024

(54) LAMINATE STRUCTURES AND FLEXIBLE PACKAGING MATERIALS INCORPORATING SAME

(71) Applicant: Dow Global Technologies LLC, Midland, MI (US)

(72) Inventors: Guihong Liao, Shanghai (CN); Jingyi Xu, Shanghai (CN); Peter Hermann Roland Sandkuehler, Zurich (CH); Thomas Galatik, Richterswil (CH); Luis Gerardo Zalamea Bustillo, Richterswil (CH)

(73) Assignee: Dow Global Technologies LLC, Midland, MI (US)

( * ) Notice: Subject to any disclaimer, the term of this patent is extended or adjusted under 35 U.S.C. 154(b) by 447 days.

This patent is subject to a terminal disclaimer.

(21) Appl. No.: 17/418,061

(22) PCT Filed: Dec. 28, 2018

(86) PCT No.: PCT/CN2018/124683
§ 371 (c)(1),
(2) Date: Jun. 24, 2021

(87) PCT Pub. No.: WO2020/133157
PCT Pub. Date: Jul. 2, 2020

(65) Prior Publication Data
US 2022/0072837 A1    Mar. 10, 2022

(51) Int. Cl.
*B32B 27/32* (2006.01)
*B29C 55/14* (2006.01)
*B32B 7/12* (2006.01)
*B32B 27/08* (2006.01)

(52) U.S. Cl.
CPC ............ *B32B 27/32* (2013.01); *B29C 55/143* (2013.01); *B32B 7/12* (2013.01); *B32B 27/08* (2013.01); *B32B 2250/03* (2013.01); *B32B 2250/24* (2013.01); *B32B 2307/31* (2013.01); *B32B 2307/518* (2013.01); *B32B 2307/732* (2013.01)

(58) Field of Classification Search
None
See application file for complete search history.

(56) References Cited

U.S. PATENT DOCUMENTS

| | | | |
|---|---|---|---|
| 3,645,992 A | 2/1972 | Elston | |
| 3,914,342 A | 10/1975 | Mitchell | |
| 4,076,698 A | 2/1978 | Anderson et al. | |
| 4,599,392 A | 7/1986 | Mckinney et al. | |
| 5,272,236 A | 12/1993 | Lai et al. | |
| 5,278,272 A | 1/1994 | Lai et al. | |
| 5,582,923 A | 12/1996 | Kale et al. | |
| 5,680,720 A | 10/1997 | Asazuma et al. | |
| 5,733,155 A | 3/1998 | Sagawa | |
| 5,854,045 A | 12/1998 | Fang et al. | |
| 5,977,251 A | 11/1999 | Kao et al. | |
| 8,440,125 B2 | 5/2013 | Breese | |
| 2009/0035594 A1 | 2/2009 | Lee et al. | |
| 2019/0299574 A1 | 10/2019 | Ackermans et al. | |
| 2022/0072837 A1 | 3/2022 | Liao et al. | |

FOREIGN PATENT DOCUMENTS

| | | |
|---|---|---|
| CN | 105774168 A | 7/2016 |
| EP | 0685331 A1 | 12/1995 |
| EP | 0697281 A1 | 2/1996 |
| EP | 2987744 B1 | 2/2016 |
| EP | 3214115 B1 | 10/2018 |
| JP | 2017193063 A | 10/2017 |
| JP | 2018521879 A | 8/2018 |
| WO | 2015154253 A9 | 10/2015 |
| WO | 2016135213 A1 | 9/2016 |
| WO | 2017000339 A1 | 1/2017 |
| WO | 2017003773 A1 | 1/2017 |
| WO | 2017184633 A1 | 10/2017 |
| WO | 2017207221 A1 | 12/2017 |

OTHER PUBLICATIONS

Taiwan Office Action dated Jul. 11, 2023, pertaining to TW Patent Application No. 108143875.
Non-Final Office Action dated Jun. 20, 2023, pertaining to U.S. Appl. No. 17/418,059, 28 pgs.
Taiwan Office Action dated Jul. 11, 2023, pertaining to TW Patent Application No. 108144260.
Notice of Reasons for Refusal dated Oct. 25, 2022, pertaining to JP Patent Application No. 2021-536828, 6 pgs.
Search Report dated Oct. 20, 2022, pertaining to JP Patent Application No. 2021-536828, 34 pgs.
Notice of Reasons for Refusal dated Oct. 25, 2022, pertaining to JP Patent Application No. 2021-536806, 6 pgs.
Search Report dated Oct. 20, 2022, pertaining to JP Patent Application No. 2021-536806, 75 pgs.
Chinese Office Action dated Jan. 11, 2023, pertaining to CN Patent Application No. 201880099932.2, 18 pgs.

(Continued)

*Primary Examiner* — Ramsey Zacharia
(74) *Attorney, Agent, or Firm* — Dinsmore & Shohl LLP

(57) ABSTRACT

Embodiments of the present disclosure are directed to laminates comprising a uniaxially oriented first multilayer film comprising ethylene-based polymer, wherein the uniaxially oriented first multilayer film has a ratio of percent elongation at break in the cross direction to percent elongation at break in the machine direction of at least 2 to 1; and a biaxially oriented second multilayer film adhered to the uniaxially oriented first multilayer film and comprising an ethylene-based polymer, wherein the biaxially oriented second multilayer film has a ratio of percent elongation at break in the machine direction to percent elongation at break in the cross direction of at least 2 to 1.

11 Claims, No Drawings

(56) References Cited

OTHER PUBLICATIONS

International Search Report and Written Opinion pertaining to PCT/CN2018/124683, dated Sep. 23, 2019.
Extended European Search Report dated Jun. 21, 2022, pertaining to EP Patent Application No. 18944883.0, 6 pgs.
Japanese Office Action dated Oct. 31, 2023, pertaining to JP Patent Application No. 2021-536828, 6 pgs.
Argentina Substantive Examination Report dated Oct. 18, 2023, pertaining to AR Patent Application No. 20190103723, 3 pgs.
Japanese Office Action dated Oct. 31, 2023, pertaining to JP Patent Application No. 2021-536806, 6 pgs.
U.S. Notice of Allowance dated Oct. 3, 2023, pertaining to U.S. Appl. No. 17/418,059, 8 pgs.

LAMINATE STRUCTURES AND FLEXIBLE PACKAGING MATERIALS INCORPORATING SAME

CROSS-REFERENCE TO RELATED APPLICATIONS

This application is a National Stage Entry under 35 U.S.C. § 371 of International Patent Application No. PCT/CN2018/124683, filed Dec. 28, 2018, the entire disclosures of which are incorporated by reference herein.

TECHNICAL FIELD

Embodiments described herein relate generally to laminate structures, and more particularly relate to laminate structures for flexible packaging materials.

BACKGROUND

Conventional laminate structures including biaxially oriented polypropylene (BOPP), biaxially oriented polyamide (BOPA), biaxially oriented polyethylene terephthalate (BOPET) are widely used in the flexible packaging market to provide balanced properties like stiffness, toughness, sealing. However, due to increased demand for recyclable packaging, there is a desire to provide mono-material based packaging in the market. However, convention polyethylene (PE) film has inferior mechanical properties compared with these conventional lamination structures.

Accordingly, there is a need for improved laminates and processes for making these laminates, wherein the laminates have the dual benefits of recyclability and mechanical strength.

SUMMARY

Embodiments of the present disclosure meet those needs by providing laminates having recyclability and mechanical strength. The present laminates combine the benefits of biaxially oriented polyethylene (BOPE) films with that of machine directed oriented polyethylene films (MDO-PE) films. The mechanical and thermal properties of the MDO/BOPE laminate beneficially enhance each other to provide a structure that provides the required recyclability and suitability for flexible packaging applications.

Specifically, the high machine direction (MD) stiffness and tensile strength of the MDO film and the low stiffness and tensile strength in the cross direction (CD) is compensated by the low stiffness and tensile strength of BOPE films in the MD direction and high stiffness and tensile strength in the CD direction. The resulting laminated film has a balanced MD and CD stiffness and tensile strength, and a good tensile elongation, to provide strong laminates to resist packaging abuse, specifically packaging abuse in drop tests.

According to at least one laminate embodiment, the laminate comprises a uniaxially oriented first multilayer film comprising ethylene-based polymer having a density from 0.930 to 0.970 g/cc and a melt index ($I_2$) from 0.1 to 10 g/10 minutes, wherein the uniaxially oriented first multilayer film is oriented in the machine direction at a draw ratio greater than 3:1 and less than 8:1, and wherein the uniaxially oriented first multilayer film has a ratio of percent elongation at break in the cross direction to percent elongation at break in the machine direction of at least 2 to 1. The laminate also comprises a biaxially oriented second multilayer film adhered to the uniaxially oriented first multilayer film and comprising an ethylene-based polymer having a density from 0.900 to 0.962 g/cc, wherein the biaxially oriented second multilayer film has a cross directional draw ratio larger than its machine direction draw ratio, and wherein the biaxially oriented second multilayer film has a ratio of percent elongation at break in the machine direction to percent elongation at break in the cross direction of at least 2 to 1.

These and other embodiments are described in more detail in the following detailed description.

DETAILED DESCRIPTION

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

Definitions

The term "polymer" refers to a polymeric compound prepared by polymerizing monomers, whether of the same or a different type. The generic term polymer thus embraces the term "homopolymer," usually employed to refer to polymers prepared from only one type of monomer as well as "copolymer" which refers to polymers prepared from two or more different monomers. The term "interpolymer," as used herein, refers to a polymer prepared by the polymerization of at least two different types of monomers. The generic term interpolymer thus includes copolymers, and polymers prepared from more than two different types of monomers, such as terpolymers.

"Polyethylene" or "ethylene-based polymer" shall mean polymers comprising greater than 50% by mole of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

The term "propylene-based polymer," as used herein, refers to a polymer that comprises, in polymerized form, refers to polymers comprising greater than 50% by mole of units which have been derived from propylene monomer. This includes propylene homopolymer, random copolymer polypropylene, impact copolymer polypropylene, propylene/α-olefin copolymer, and propylene/α-olefin copolymer.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems as well as single-site catalysts, including, but not limited to, bis-metallocene catalysts (sometimes referred to as "m-LLDPE") and constrained geometry catalysts, and includes linear, substantially linear or heterogeneous polyethylene copolymers or homopolymers. LLDPEs contain less long chain branching than LDPEs and include the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or U.S. Pat. No. 5,854,045). The LLDPEs can be made via gas-phase, solution-phase or slurry polymerization or any combination thereof, using any type of reactor or reactor configuration known in the art.

The term "MDPE" refers to polyethylenes having densities from 0.926 to 0.935 g/cm$^3$. "MDPE" is typically made using chromium or Ziegler-Natta catalysts or using single-site catalysts including, but not limited to, bis-metallocene catalysts and constrained geometry catalysts, and typically have a molecular weight distribution ("MWD") greater than 2.5.

The term "HDPE" refers to polyethylenes having densities greater than about 0.935 g/cm$^3$, which are generally prepared with Ziegler-Natta catalysts, chrome catalysts or single-site catalysts including, but not limited to, bis-metallocene catalysts and constrained geometry catalysts.

As used herein, the term, "monomaterial" means that the laminate structures are composed substantially of polyethylene, wherein "substantially" means at least 95 wt. % polyethylene, or at least 99 wt. % polyethylene, or at least 99.5 wt. % polyethylene, or at least 99.9 wt. % based on the overall weight of the laminate structure.

"Multilayer structure" means any structure having more than one layer. For example, the multilayer structure may have two, three, four, five or more layers. A multilayer structure may be described as having the layers designated with letters. For example, a three layer structure having a core layer B, and two external layers A and C may be designated as A/B/C.

The terms "flexible packaging" or "flexible packaging material" encompass various non-rigid containers familiar to the skilled person. These may include pouches, stand-up pouches, pillow pouches, or bulk bags bulk bags, pre-made packages or the like. Some typical end use applications for flexible packages are for snack, dry food, liquid, or cheese packages. Other end use applications include, but are not limited to, pet foods, snacks, chips, frozen foods, meats, hot dogs, and numerous other applications.

The terms "comprising." "including." "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Reference will now be made in detail to laminate structure embodiments of the present disclosure, specifically laminate structures used in flexible packaging materials.

Embodiments are directed to laminates comprising a uniaxially oriented first multilayer film comprising ethylene-based polymer having a density from 0.900 to 0.962 g/cm$^3$ and a melt index ($I_2$) from 0.1 to 10 g/10 minutes. The uniaxially oriented first multilayer film, which may also be referred to herein as an MDO film or an MDO-PE film, is oriented in the machine direction at a draw ratio greater than 1:1 and less than 8:1. Moreover, the uniaxially oriented first multilayer film has a ratio of percent elongation at break in the cross direction to percent elongation at break in the machine direction of at least 2 to 1.

Additionally, the laminate comprises a biaxially oriented second multilayer film adhered to the uniaxially oriented first multilayer film. The laminate comprises an ethylene-based polymer having a density from 0.900 to 0.962 g/cm$^3$. The biaxially oriented second multilayer film has a cross directional draw ratio larger than its machine direction draw ratio, and the biaxially oriented second multilayer film has a wherein the biaxially oriented second multilayer film has a ratio of percent elongation at break in the machine direction to percent elongation at break in the cross direction of at least 2 to 1.

Uniaxially Oriented First Multilayer Film

In one or more embodiments, the uniaxially oriented first multilayer film may include HDPE in at least one layer in order to provide heat resistance for the laminate during heat seal. In one or more embodiments, the uniaxially oriented first multilayer film comprises at least 10% by weight HDPE, or at least 15% by weight HDPE, or at least 20% by weight HDPE. The uniaxially oriented first multilayer film may include 95% by weight ethylene-based polymer, or 99% by weight ethylene-based polymer, or 99.9% by weight ethylene-based polymer, or 100% by weight ethylene-based polymer. The high density polyethylene of the uniaxially oriented first multilayer film may have a density of at least 0.950 g/cc, or at least 0.950 g/cc, or at least 0.960 g/cc. In other embodiments, the high density polyethylene may have a density from 0.950 to 0.975 g/cc, or from 0.955 to 0.970 g/cc. Moreover, the high density polyethylene may have a melt index from 0.5 to 2 g/10 mins, or from 0.6 to 1 g/10 mins. Commercial Examples may include ELITE™ 5960G from The Dow Chemical Company, Midland, MI.

Various thicknesses are contemplated for the uniaxially oriented first multilayer film. In one embodiment, the uniaxially oriented first multilayer film has a thickness from 15 to 30 μm.

In another embodiment, the uniaxially oriented first multilayer film may comprise at least one outer layer having a high density polyethylene comprising a density of at least 0.950 g/cc, and a melt index ($I_2$) from 0.3 to 5 g/10 mins, at least one inner layer comprising an ethylene-based polymer having a density less than 0.920 g/cc and a melt index from 0.5 to 5 g/10 mins, and at least one intermediate layer disposed between the at least one inner layer and the at least one outer layer, the intermediate layer comprising an ethylene based polymer having a density greater than 0.930 g/cc.

The high density polyethylene in the outer layer may include the density ranges and melt index values provided above. The outer layer may have a thickness of 2 to 10 μm, or from 2 to 4 μm.

As stated above, at least one inner layer comprising an ethylene-based polymer having a density less than 0.920 g/cc and a melt index from 0.5 to 5 g/10 mins. In one or more embodiments, the inner layer may include a polyolefin plastomer having a density less than 0.900 g/cc, or less than 0.900 g/cc, or less than 0.890 g/cc, or less than 0.880 g/cc, or less than 0.875 g/cc. In further embodiments, the polyolefin plastomer of the inner layer has a density from 0.860 to 0.900 g/cc, or from 0.860 to 0.885 g/cc, or from 0.865 to 0.875 g/cc. Moreover, the polyolefin plastomer of the inner layer has a melt index from 0.5 to 3 g/10 mins, or from 0.6 to 1.5 g/10 mins, or from 0.8 to 1.2 g/10 mins. Commercial Examples of the polyolefin plastomer may include AFFINITY™ 8100, AFFINITY™ 8200, AFFINITY™ 1880, and AFFINITY™ 1140, all of which are available from The Dow Chemical Company, Midland, MI.

In some embodiments, for example, non-blocked asymmetric film embodiments, it is contemplated that the inner layer comprises an additional ethylene-based polymer blended with the polyolefin plastomer. Various embodiments are contemplated for the ethylene based polymer. In one or more embodiments, the inner layer comprises a density greater than 0.910 g/cc and a melt index ($I_2$) from 0.5 to 5 g/10 mins. Suitable commercial examples may include ELITE™ or INNATE™ polymers available from The Dow Chemical Company, Midland, MI. The inner layer may have a thickness of 2 to 10 μm, or from 2 to 5 μm.

In the intermediate layer of the uniaxially oriented first multilayer film, the ethylene based polymer may have a density greater than 0.930 g/cc, or greater than 0.935 g/cc. In other embodiments, the ethylene-based polymer may have a density from 0.920 to 0.950 g/cc, or from 0.925 to 0.945 g/cc, or from 0.935 to 0.945 g/cc. Moreover, the ethylene-based polymer of the intermediate layer may have a melt index from 0.5 to 2 g/10 mins, or from 0.6 to 1 g/10 mins. Commercial Examples may include ELITE™ 5940ST from The Dow Chemical Company, Midland, MI. The intermediate layer may have a thickness of 8 to 30 μm.

In yet another embodiment, the uniaxially oriented first multilayer film may include a propylene-based polymer. The propylene-based polymer may be used alone or in combination with the embodiments described herein. The propylene-based polymer may have a density of 0.850 g/cc to 0.900 g/cc, or 0.855 to 0.895. The propylene-based polymer may have a melt flow rate (MFR) of 1 to 25, or 1 to 10 g/10 mins. Various commercial embodiments are contemplated as suitable. These may include Vistamaxx™ 3000, Vistamaxx™ 3020FL, Vistamaxx™ 3588FL and Vistamaxx™ 6102/6102FL, which are produced by ExxonMobil. Additionally, VERSIFY™ 2000 and VERSIFY™ 2300 from The Dow Chemical Company, Midland, MI may also be utilized.

Various processing parameters are considered suitable for stretching in the machine direction. For example, the uniaxially oriented first multilayer film may be oriented in the machine direction at a draw ratio greater than 3:1 and less than 8:1, or at a draw ratio from 4:1 to 8:1.

As stated above, the uniaxially oriented first multilayer film has a ratio of percent elongation at break in the cross direction to percent elongation at break in the machine direction of at least 2 to 1. In further embodiments, the ratio of the percent elongation at break in the cross direction to percent elongation at break in the machine direction is at least 3 to 1, or at least 5 to 1, or at least 8 to 1 for the uniaxially oriented first multilayer film. Said another way, the uniaxially oriented first multilayer film has percent elongation at break in the cross direction greater by at least 100% than the percent elongation at break in the machine direction, or greater by at least 200%, or greater by at least 300%.

Biaxially Oriented Second Multilayer Film

It is contemplated that the biaxially oriented second multilayer film may be a monolayer film or a multilayer film. For example, the biaxially oriented second multilayer film can further comprise other layers typically included in multilayer films depending on the application including, for example, sealant layers, barrier layers, tie layers, other polyethylene layers, etc. In one or more embodiments, the biaxially oriented second multilayer film may have a thickness from 15 to 100 μm, or from 15 to 40 μm. The biaxially oriented second multilayer film may include 95% by weight ethylene-based polymer, or 99% by weight ethylene-based polymer, or 99.9% by weight ethylene-based polymer, or 100% by weight ethylene-based polymer.

The ethylene-based polymer of the biaxially oriented second multilayer film may have a density from 0.915 to 0.940 g/cc, or from 0.920 to 0.935 g/cc, or from 0.920 to 0.930 g/cc. The biaxially oriented second multilayer film may have a melt index from 0.5 to 2 g/10 mins, or from 0.6 to 1 g/10 mins.

The biaxially oriented second multilayer film may comprise a linear low density polyethylene (LLDPE). Suitable LLDPE's include Ziegler-Natta catalyzed linear low density polyethylene, single site catalyzed (including metallocene) linear low density polyethylene (mLLDPE), and medium density polyethylene (MDPE) so long as the MDPE has a density no greater than 0.940 g/cm$^3$ as well as combinations of two or more of the foregoing. The LLDPE may have a density and melt index ($I_2$) as defined by the ranges above. The biaxially oriented second multilayer film can comprise greater than 50 weight percent LLDPE in some embodiments, greater than 60 weight percent in other embodiments, and greater than 70 weight percent in other embodiments.

In some embodiments, the biaxially oriented second multilayer film can further comprise one or more additional polymers including, for example, a high density polyethylene, a low density polyethylene, an ultra-low density polyethylene, a polyethylene plastomer, a polyethylene elastomer, an ethylene vinyl acetate, or a combination thereof. In such embodiments, the one or more additional polymers can be present in an amount less than 50 weight percent.

The biaxially oriented polyethylene film can further comprise one or more additives as known to those of skill in the art such as, for example, antioxidants, phosphites, cling additives, anti-static agents, pigments, colorants, fillers, or combinations thereof.

In one or more embodiments, the biaxially oriented second multilayer film is biaxially oriented using a tenter frame sequential biaxial orientation process. Such techniques are generally known to those of skill in the art. In other embodiments, the polyethylene film can be biaxially oriented using other techniques known to those of skill in the art based on the teachings herein, such as double bubble orientation processes. In general, with a tenter frame sequential biaxial orientation process, the tenter frame is incorporated as part of a multilayer co-extrusion line. After extruding from a flat die, the film is cooled down on a chill roll, and is immersed into a water bath filled with room temperature water. The cast film is then passed onto a series of rollers with different revolving speeds to achieve stretching in the machine direction. There are several pairs of rollers in the MD stretching segment of the fabrication line, and are all oil heated. The paired rollers work sequentially as pre-heated rollers, stretching rollers, and rollers for relaxing and annealing. The temperature of each pair of rollers is separately controlled. After stretching in the machine direction, the film web is passed into a tenter frame hot air oven with heating zones to carry out stretching in the cross direction. The first several zones are for pre-heating, followed by zones for stretching, and then the last zones for annealing.

In some embodiments, the biaxially oriented second multilayer film is oriented in the machine direction at a draw ratio from 2:1 to 6:1 and in the cross direction at a draw ratio from 2:1 to 9:1. The biaxially oriented second multilayer film, in some embodiments, is oriented in the machine direction at a draw ratio from 3:1 to 5:1 and in the cross direction at a draw ratio from 3:1 to 8:1.

The biaxially oriented second multilayer film has a cross directional draw ratio larger than its machine direction draw ratio, and the biaxially oriented second multilayer film has a wherein the biaxially oriented second multilayer film has a ratio of percent elongation at break in the machine direction to percent elongation at break in the cross direction of at least 2 to 1. In further embodiments, the ratio of percent elongation at break in the machine direction to percent elongation at break in the cross direction is at least 3 to 1, or at least 4 to 1 for the biaxially oriented second multilayer film. Said another way, wherein the biaxially oriented second multilayer film has percent elongation at break in the machine direction greater by at least 100% than percent elongation at break in the cross direction, or greater by at least 200%, or greater by at least 300%.

Adhesive Layers

Various adhesive compositions are considered suitable for the adhesives used the laminate. These may include polyurethane, epoxy, acrylic, or the like. In one embodiment, the laminate may comprises adhesive layers comprising polyurethane adhesive. The polyurethane adhesive may be solventless or solvent based. Furthermore, the polyurethane adhesive may be a two part formulation.

Laminate

Without being limited by theory, the combination of the two films provides an isotropic laminate. As used herein, "isotropic" means the laminate has a percent elongation at break in the cross direction within 30% of the percent elongation at break in the machine direction. Said another way, this means that the laminate yield similar tensile results in the MD direction or the cross direction. In further embodiments, the present laminates may have a percent elongation at break in the cross direction within 25%, or within 20% of the percent elongation at break in the machine direction.

Article

As stated above, the laminate may be included in a flexible packaging material, such as a stand-up pouch.

Testing Methods

The test methods include the following:

Melt index ($I_2$)

The Melt index ($I_2$) of the ethylene-based polymers was measured in accordance to ASTM D-1238 at 190° C. at 2.16 kg. The values are reported in g/10 min, which corresponds to grams eluted per 10 minutes.

Melt Flow Rate (MFR)

The Melt Flow Rate of the propylene-based polymers was measured according to ASTM D-1238 at 230° C. and 2.16 kg. The values are reported in g/10 min, which corresponds to grams eluted per 10 minutes.

Density

Samples for density measurement were prepared according to ASTM D4703 and reported in grams/cubic centimeter (g/cc or g/cm$^3$). Measurements were made within one hour of sample pressing using ASTM D792, Method B.

Tensile Properties

Percent elongation, elongation at break, and force at break were determined in both the machine direction (MD) and cross direction (CD) in accordance with the ASTM D-882-method. The machine used was an Instron 5965 Tensile Tester and operated with a pulling speed of 500 mm/min. The sample width was 1 inch.

Heat Seal Testing

To determine heat seal strength and heat seal initiation temperature, the samples were sealed by a J&B Hot Tack 4000 Tester. The sample width was 1 inch, the seal time was 0.5 seconds, and the seal pressure was 0.275 N/mm$^2$. Then, the sealed samples were aged for 24 hours before heat seal strength was tested on an Instron 5965 Tensile Tester at a pulling speed of 500 mm/min.

EXAMPLES

The following examples illustrate features of the present disclosure but are not intended to limit the scope of the disclosure.

Commercial Polymers Used

The following listed polymers were used in the experimental laminates described below. All of the polymers are produced by The Dow Chemical Company, Midland, MI.

TABLE 1

| Polymer | Density (g/cc) | Melt Index (g/10 mins) |
| --- | --- | --- |
| ELITE ™ 5940ST | 0.941 | 0.85 |
| ELITE ™ 5960G | 0.96 | 0.85 |
| AFFINITY ™ EG 8100G | 0.870 | 1.0 |
| ELITE ™ 5500 | 0.914 | 1.5 |

Fabrication of BOPE Films

Referring to Table 2 below, BOPE Samples 1 and 2 are commercial BOPE products from Decro, specifically which DL40 for 40 μm BOPE Sample 1 and DL50 for 50 μm BOPE Sample 2. The DL40 and DL50 BOPE films have a polyethylene polymer with a density of density of 0.925 g/cc.

TABLE 2

| BOPE Sample | Thickness (μm) | Elongation at Break MD (%) | Force at Break MD (N) | Stress at Break MD (MPa) | Elongation at Break CD (%) | Force at Break CD (N) | Stress at Break CD (MPa) |
| --- | --- | --- | --- | --- | --- | --- | --- |
| Sample 1 | 40 | 353.85% | 46.75 | 51.40 | 62.10% | 102.30 | 108.29 |
| Sample 2 | 50 | 325.07% | 74.66 | 62.98 | 73.64% | 143.12 | 105.92 |

As shown in Table 2, these BOPE Samples of various thicknesses were studied. The data illustrates that in MD direction of the film, the tensile curve is rather flat shows high elongation at break. The CD tensile direction was very stiff and had low elongation at break. This asymmetric difference in MD and CD tensile behavior is not beneficial for drop test resistance. In addition, the thermal resistance of this BOPE film was lower than desired, and shrinkage could occur when the film is heated above 130° C.

Fabrication of MDO Films

Referring to Table 3 below, an MDO film (MDO Sample 1) was prepared on a blown film MDO line at a draw ratio of 6.5. The die head had a 400 mm diameter with output of 448 kg/h, and a final winding speed of 226 m/min. The Blow Up Ratio (BUR) used was 2.6 (layflat before stretching was 1650 mm). The primary film thickness (before blocking) was 64 μm. The secondary film thickness (after stretching) was 25 μm. (600% stretching). The die temperature was 200° C., except for 210° C. in the last two zones. Extrusion temperatures were all set at 200° C.

TABLE 3

| MDO Sample 1 Layer Structure | Composition | Thickness Before Stretching (μm) | Thickness After Stretching (μm) |
|---|---|---|---|
| A | ELITE 5960G | 18 | 3 |
| B | ELITE 5940ST | 30 | 5 |
| C | AFFINITY 8100G | 12 | 2 |
| C | AFFINITY 8100G | 12 | 2 |
| B | ELITE 5940ST | 30 | 5 |
| A | ELITE 5960G | 18 | 3 |

The film tensile behavior of the MDO film is listed in the following Table 4, As shown, the MDO film has high elongation at break of about 169.7% in the CD direction but much stiffer than in MD direction. Thus, it compensates for the tensile properties of the BOPE film.

TABLE 4

| MDO Sample | Thickness (μm) | Elongation at Break MD (%) | Force at Break MD (N) | Stress at Break MD (MPa) | Elongation at Break CD (%) | Force at Break CD (N) | Stress at Break CD (MPa) |
|---|---|---|---|---|---|---|---|
| MDO Sample 1 | 20 | 65.12% | 112.24 | 197.66 | 169.7% | 9.13 | 16.64 |

Laminate Procedure

In the laminate process, adhesive was applied on the MDO film, after which the second film (MDO-PE film) was pressed against it to produce a duplex laminate. The adhesive used was MOR-FREE™ 698A/C79 adhesive, which was well mixed at a weight ratio of 100/50, and then diluted to 30% solid content solution using ethyl acetate. The adhesive was then coated on an A4 size MDO film using a Hand Drawdown Coater: K Control Coater 101 with a dry coating weight of 1.6 g/m². The coated films were dried in the oven at 80° C. for 40 seconds before lamination with the BOPE film. Manual lab lamination was conducted with a nip pressure at 3 bar and a nip temperature of 65° C. using a hot roll laminator. Then the laminated film of MDO//BOPE films was cured at 45°C for 24 hours. Table 5 as follows includes tensile properties for the duplex samples.

TABLE 5

| Samples | Thickness (μm) | Elongation at Break MD (%) | Force at Break MD (N) | Stress at Break MD (MPa) | Elongation at Break CD (%) | Force at Break CD (N) | Stress at Break CD (MPa) |
|---|---|---|---|---|---|---|---|
| Inventive Duplex 1 (MDO Sample 1/ BOPE Sample 1) | 67 | 64.96% | 151.92 | 89.03 | 82.41% | 124.62 | 70.92 |
| Inventive Duplex 1 (MDO Sample 1/ BOPE Sample 2) | 76 | 66.16% | 161.08 | 84.29 | 83.74% | 132.54 | 72.78 |

As shown, the combination of MDO and BOPE enabled both duplex samples to be isotropic i.e., maintain a percent elongation at break in the MD direction within 30% of the percent elongation at break in the CD direction. In fact, the percent elongation at break in the MD direction is within 20% of the percent elongation at break in the CD direction.

Additionally, as shown in Table 6, the duplex samples of Table 5 were evaluated based on heat seal strength.

TABLE 6

| Sample | 90° C. | | 100° C. | | 110° C. | | 120° C. | |
|---|---|---|---|---|---|---|---|---|
| | Seal Strength (N/15 mm) | Shrinkage | Seal Strength (N/15 mm) | Shrinkage | Seal Strength (N/15 mm) | Shrinkage | Seal Strength (N/15 mm) | Shrinkage |
| Inventive Duplex 1 | 11.91 | No | 41.88 | No | 34.5 | No | 44.73 | No |
| Inventive Duplex 2 | 8.24 | No | 37.11 | No | 41.38 | No | 37.27 | No |
| BOPE 40 μm | 13.11 | Yes | 27.09 | Yes | 31.45 | Yes | 30.85 | Yes |
| BOPE 50 μm | 9.87 | Yes | 28.14 | Yes | 33.18 | Yes | 33.2 | Yes |

As shown in Table 6, the comparative BOPE films generally showed less seal strength than the inventive duplex laminates. At temperatures as low as 90° C., the BOPE films showed shrinkage, which is highly undesirable for packaging applications. In contrast, after lamination with MDO-PE film, the heat resistance improved and the inventive duplex laminates did not show any shrinkage.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:

1. A laminate comprising:
   a uniaxially oriented first multilayer film comprising ethylene-based polymer having a density from 0.930 to 0.970 g/cm³ and a melt index ($I_2$) from 0.1 to 10 g/10 minutes, as measured at 190° C. and 2.16 g, wherein the uniaxially oriented first multilayer film is oriented in the machine direction at a draw ratio greater than 3:1 and less than 8:1, and wherein the uniaxially oriented first multilayer film has a ratio of percent elongation at break in the cross direction to percent elongation at break in the machine direction of at least 2 to 1; and
   a biaxially oriented second multilayer film adhered to the uniaxially oriented first multilayer film and comprising an ethylene-based polymer having a density from 0.900 to 0.962 g/cm³, wherein the biaxially oriented second multilayer film has a cross directional draw ratio larger than its machine direction draw ratio, and wherein the biaxially oriented second multilayer film has a ratio of percent elongation at break in the machine direction to percent elongation at break in the cross direction of at least 2 to 1.

2. The laminate of claim 1, wherein the uniaxially oriented first multilayer film has percent elongation at break in the cross direction greater by at least 300% than percent elongation at break in the machine direction, and wherein the biaxially oriented second multilayer film has percent elongation at break in the machine direction greater by at least 300% than percent elongation at break in the cross direction.

3. The laminate of claim 1, wherein the ratio of percent elongation at break in the cross direction to percent elongation at break in the machine direction of at least 3 to 1 for the uniaxially oriented first multilayer film, and has a ratio of percent elongation at break in the machine direction to percent elongation at break in the cross direction of at least 3 to 1 for the biaxially oriented second multilayer film.

4. The laminate of claim 1, wherein the uniaxially oriented first multilayer film has a thickness from 15 to 30 μm, and the biaxially oriented second multilayer film has a thickness of 15 to 100 μm.

5. The laminate of claim 1, wherein the uniaxially oriented first multilayer film comprises:
   at least one outer layer having a high density polyethylene comprising a density of at least 0.950 g/cc, and a melt index ($I_2$) from 0.3 to 5 g/10 mins, as measured at 190° C. and 2.16 g;
   at least one inner layer comprising a polyolefin plastomer having a density less than 0.900 g/cc and a melt index ($I_2$) from 0.5 to 5 g/10 mins, as measured at 190° C. and 2.16 g; and
   at least one intermediate layer disposed between the at least one inner layer and the at least one outer layer, the intermediate layer comprising an ethylene based polymer having a density greater than 0.930 g/cc.

6. The laminate of claim 1, where the biaxially oriented multilayer film contains a sealant layer.

7. The laminate of claim 1, wherein the uniaxially oriented first multilayer film comprises at least 10% by weight HDPE.

8. The laminate of claim 1, wherein the ethylene-based polymer of the biaxially oriented second multilayer film has a density of 0.915 to 0.940 g/cc, and a melt index ($I_2$), as measured at 190° C. and 2.16 g, from 0.5 to 2.0 g/10 mins.

9. The laminate of claim 1, wherein the laminate comprises adhesive layers comprising polyurethane adhesive.

10. The laminate of claim 1, wherein the laminate has a percent elongation at break in the cross direction within 40% of the percent elongation at break in the machine direction.

11. An article comprising the laminate structure of claim 1,
   wherein the article is a flexible packaging material.

* * * * *